United States Patent [19]

Komatsu et al.

[11] Patent Number: 4,844,833

[45] Date of Patent: Jul. 4, 1989

[54] PAINT PEELING COMPOSITION AND PAINT PEELING METHOD

[75] Inventors: Keisaku Komatsu; Takashi Yamada; Toshimi Owatari, all of Youkaichi, Japan

[73] Assignee: Kaken Kogyo, Co., Ltd., Hirakata, Japan

[21] Appl. No.: 248,247

[22] Filed: Sep. 19, 1988

Related U.S. Application Data

[63] Continuation of Ser. No. 7,300, Jan. 27, 1987, abandoned.

[30] Foreign Application Priority Data

Jan. 28, 1986 [JP] Japan .................................. 61-17630
Apr. 18, 1986 [JP] Japan .................................. 61-90684

[51] Int. Cl.$^4$ ......................... C11D 10/00; B08B 7/00
[52] U.S. Cl. ........................ 252/174.13; 252/174.23; 252/381; 252/383; 252/DIG. 2; 252/DIG. 8; 252/DIG. 3; 134/4; 134/38
[58] Field of Search ...................... 252/174.13, 174.23, 252/DIG. 8, DIG. 2, 381, 383, DIG. 3; 134/4, 138

[56] References Cited

U.S. PATENT DOCUMENTS

| | | | |
|---|---|---|---|
| 2,811,456 | 10/1957 | Coleman | 134/4 |
| 3,635,827 | 1/1972 | Jakobi | 252/174.23 |
| 3,689,435 | 9/1972 | Berni | 252/174.23 |
| 3,819,525 | 6/1974 | Hatterbrun | 252/174.23 |
| 3,846,172 | 11/1974 | Fossatti | 134/38 |
| 3,979,339 | 9/1976 | Claybough | 252/174.23 |
| 4,199,375 | 4/1980 | Muller | 134/4 |
| 4,626,372 | 12/1986 | Kaufmann | 252/174.23 |

FOREIGN PATENT DOCUMENTS

2603290 8/1977 Fed. Rep. of Germany ........................ 252/174.23
53-5049 2/1978 Japan .

*Primary Examiner*—Asok Pal
*Attorney, Agent, or Firm*—Jordan and Hamburg

[57] ABSTRACT

A paint peeling composition containing as effective components thereof 17 to 25 weight parts of polyvinylalcohol and a substance capable of forming a group of minute bubbles. And, a paint peeling method wherein the paint peeling composition is applied to an object not to be painted and then is dried to form a coating thereon and after paint is adhered to the coating the adhered paint is exposed to a liquid prepared by water-diluting a paint re-adherence preventing composition containing as an effective component thereof polyvinylalcohol and prepared by being heated up to a predetermined temperature, thereby to peel off the adhered paint.

5 Claims, No Drawings

PAINT PEELING COMPOSITION AND PAINT PEELING METHOD

This application is a continuation of application Ser. No. 007,300, filed Jan. 27, 1987, now abandoned.

BACKGROUND OF THE INVENTION

The present invention relates to a paint peeling composition and a paint peeling method for peeling off hardened or unhardened paint adhered to objects not to be painted such as a duckboard, a floor, a table for mounting thereon an object to be painted and a cover of an automatic coater placed at a work place for painting.

Known methods for peeling off a thermosetting resin paint and the like adhered to the object not to be painted are as follows:

(a) An object not to be painted is pre-coated with a paint peeling composition including as effective components thereof a thermoplastic resin paint and an organic solvent. Unnecessary paint adhered to this coating is peeled off by cracking the coated surface with a hammer and the like (Japanese patent application published or laid open under SHOWA 57-195774).

(b) The object not to be painted is pre-coated with a paint peeling composition including as effective components thereof coating-forming material and a water-absorbent polymer. When unnecessary paint adhered to this coating is water-washed, the water-absorbent polymer reacts with the water and then absorbs much of the same. A volumetric expansion of a ratio of tens or hundreds times associated with this water absorption serves to float the adhered unnecessary paint off the object not to be painted and thereafter the floated paint is peeled off with a pallet, pliers, a hammer, a drill and the like (Japanese patent application published or laid open under SHOWA 57-19067).

(c) The adhered unnecessary paint is peeled off by being burnt in a burner and the like.

(d) The adhered unnecessary paint is peeled off by being re-solved by an organic solvent.

(e) The unnecessary paint is peeled off by being submerged in boiling caustic soda for approximately 12 hours to cause a chemical reaction therein.

(f) The unnecessary paint is scraped off by a metalic pallet and the like.

Problems with the above methods will be respectively discussed hereinafter. (a) Much of the mechanical impact applied to the coated surface is absorbed into the object per se through the coating. Therefore, a considerable impact is needed to cause the paint to crack. (b) The contact between the water-absorbent polymer and the water needed for the chemical reaction is interfered with by the coated surface. Or, if the paint peeling composition is pre-coated at a high temperature (about 300° C.), the water-absorbent polymer is carbonized to such an extent that it loses its water-absorbing expansion characteristics. Furthermore, this method is unfeasible for a water base paint including water such as a water soluble paint or a water-dilutable emulsion paint. (c) This method is unfeasible for an unmovable object such as the floor of the work place and for an object subject to thermal transformation or to thermal solution. Moreover, this method tends to cause smoke pollution or toxic gases such as nitrogen oxides. (d) This method is unfeasible for an unmovable object such as the floor of the work place and for a pre-painted object such as the cover of the automatic coater. (e) According to this method, the peeling operation is very time consuming. And, moreover, the object need undergo a neutralization process after the paint peeling operation; otherwise, the object may incur rust. In addition, the caustic soda may pose human health hazard, and the waste liquid disposal of the caustic soda used for the peeling operation is very costly. (f) According to this method, if the adhered paint is a viscous, unhardened paint, the scraping operation is very labor-consuming.

SUMMARY OF THE INVENTION

Taking the above state of art into consideration, a first object of the present invention is to facilitate and speed up the peeling off operation of the unnecessary paint adhered to the object not to be painted and at the same time to provide a paint peeling composition applicable for a greater variety of objects. A second object of the present invention is to provide a paint peeling method by which the first object is achieved and at the same time a re-adherence of the paint peeled off the object is prevented and the peeled paint is readily collected.

The above first object of the present invention is achieved by a paint peeling composition comprising as effective components thereof 17 to 25 weight percent of polyvinylalcohol and a substance forming a group of minute bubbles in the applied coating.

More particularly, this paint peeling composition is pre-applied to an object not to be painted and then dried so as to form a coating on the surface of this object. Then, as the painting operation proceeds, when a predetermined amount of unnecessary paint is adheredly accumulated on the coating up to a point where peeling thereof is needed, if, for example, this object is exposed to hot water, the adhered paint is softened by the heat and at the same time monomer or solvent component contained in the paint generates bubbles thereby to lift up the paint and further the substance capable of forming minute bubbles in the coating per se, e.g. synthetic resin balloons (microballoons) contained in the paint peeling composition e.g expands volumetrically by the heat and the like and lifts the adhered paint off the surface of the object not to be painted. Moreover, polyvinylalcohol contained in the paint peeling composition is re-solved or re-dispersed upon being exposed to the hot water whereby the substance capable of forming small bubbles is freed from the object thereby to free the paint. In this case, if the substance has such characteristics as to expand at a temperature higher than that required for drying the paint, the disintegration of the coating may be more effectively carried out since the coating is softened by the heating. More specifically, a substance which expands at a temperature 20° to 50° C. higher than the drying temperature of the paint is preferable for facilitating and speeding-up the coating removing operation.

After the peeling off operation, the object will be ready for the next painting operation after being water-washed, dried and then applied with the paint peeling composition.

According to the above-described method, since strong mechanical impact is not applied to the unnecessary paint adhered to the object not to be painted, the object does not suffer deformation or damage and the unnecessary paint may be peeled off effectively and speedily without fire hazard and human health hazard. Furthermore, since the paint may be removed only by exposing the object to hot water and the like, no waterwashing or neutralization process of the waste liquid is necessary and the method may be applied to objects unmovable from the work place, whereby the method is feasible for a greater variety of objects compared with the conventional methods.

The aforementioned second object of the present invention may be achieved by a paint peeling method in which the paint peeling composition comprising as effective components thereof 17 to 25 weight percent of polyvinylalcohol and the substance capable of forming a group of small bubbles in the applied coating is applied to the object not to be painted and then dried to form the coating thereon. When a predetermined amount of unnecessary paint is adheredly accumulated on this coating, this accumulated paint is peeled off by being exposed to a liquid prepared by water-diluting and then by heating a paint re-adherence preventing composition (acting also as a paint peeling promoting composition) containing as an effective component thereof polyvinylalcohol.

More particularly, the paint peeling composition is pre-applied to the object not to be painted and then dried thereby to form the coating on the surface of the object. When the unnecessary paint is adheredly accumulated on the coating, as painting operation proceeds, up to a point where a peeling-off operation of the accumulated paint is necessary, for example, the object is submerged in the heated liquid prepared by diluting by a predetermined amount of water and then by heating the paint re-adherence preventing composition containing as an effective component thereof polyvinylalcohol. Then, a protective colloid film having no or little viscosity is formed on the surface of paint adhered to the object and at the same time monomers or solvents contained in the paint generate bubbles in response to the heat thereby to lift up the paint and further the substance capable of forming small bubbles, such as synthetic resin balloons, contained in the paint peeling composition volumetrically expands in response to the heat and the like thereby to lift up the adhered paint off the object. In addition, as the polyvinylalcohol contained in the paint peeling composition is resolved or re-dispersed upon being exposed to the liquid, the volumetrically expanded substance such as the synthetic resin balloons is freed from the object to cause the paint to lift up by its own buoyancy to an upper portion of the liquid. In the above process, the resolved polyvinylalcohol is dispersed in the liquid to form the protective colloid film on the surface of the paint thereby to prevent the peeled paint from being re-adhered to other objects. Accordingly, the unnecessary paint is completely peeled off the object.

After the paint peeling operation, the object is taken out of the liquid, water-washed, dried and then is re-coated with the paint peeling composition. Then, the object is ready for the next painting operation.

On the other hand, because of the effect of the protective colloid film, the waste paint left in the liquid may be easily scooped out of the liquid even by a simply constructed mesh and the like. Further, since there is no paint left in the liquid, the remaining liquid is re-usable merely by adding thereto some water for compensating the water evaporated in the course of heating. As for the application of this method to an object unmovable from the work place such as the floor, the paint peeling composition is pre-applied to the surface of the floor and then dried to form the coating thereon. Thereafter, when the paint peeling operation becomes necessary as the painting operation proceeds, the aforementioned heated liquid is spilled over the floor. Then, the paint is peeled off the floor without being re-adhered to other objects in the same manner as in the above case.

Therefore, according to the present method, the unnecessary paint adhered to the object may be speedily, readily and safely peeled off without causing deformation or other damage to the object and without causing fire hazard or human health hazard, and at the same time the present method is applicable to a greater variety of objects. In addition, since the paint peeled off the object becomes non-viscous because of the effect of the protective colloid film, the re-adherence of the peeled-off paint is prevented and at the same time the collecting of the same may be effectively and easily carried out.

DESCRIPTION OF THE PREFERRED EMBODIMENTS

Preferred embodiments of the paint peeling composition and paint peeling method related to the present invention will be particularly described hereinafter.

The paint peeling composition according to the present invention contains as its effective components 17 to 25 weight parts of polyvinylalcohol and a substance capable of forming a group of small bubbles in a surface of coating per se to be formed on a surface of an object not to be painted.

It is to be noted that the amount of polyvinylalcohol to be contained in the composition as the effective component need be at least 17 weight parts. That is, if the amount is less than this, the coating to be formed will have too small strength such that the coating may be easily cracked or peeled upon contact, for example, with safety boots worn by workers. In addition, since the amount of water contained in the paint peeling composition increases relatively, it takes longer to dry the coating whereby the working efficiency deteriorates.

On the other hand, if the amount of polyvinylalcohol exceeds 25 weight percent, increased viscosity of the paint peeling composition makes it troublesome to apply the composition to the surface of the object. Thus, this is also to be avoided.

The substance for forming the bubbles may comprise a foamed hollow matter such as shirasu balloons, glass balloons, carbon balloons and foamed synthetic resin balloons or an unfoamed latently hollow matter such as unfoamed latent synthetic resin balloons. These materials may be used singly or in a combination. If the combination of these are suitably arranged, it is possible to freely control starting temperature of foaming and a foaming multiplying ratio. Also, it is possible to use a low boiling solvent which is foamed by baking after the application of the coating to the object. Further, a chemical substance, such as azobisisobutyronitrile may be used which chemically reacts without baking to generate gas after the application of the coating, or a high-pressured freon (ie fuorocarbon) gas may be used which is foamed when air pressure is reduced to the normal level after the application of the coating.

In addition to the aforementioned effective components, a water-soluble film forming binder such as butylcellulose or various types of additives such as thixotropy promoting agent, antiseptic agent, rust inhibitor and defoaming agent may be added to the composition.

In many painting factories, alkaline degreasing operation and zinc phosphate operation in addition to water-soluble painting and electrodeposition coating are carried out before the painting operation. In this case, if such a substance is selected for forming the coating that has alkali resistance or acid resistance property, it is possible to continuously carry out all of the processing before painting, the painting and baking-drying. Moreover, if there is provided a device for heating walls of painting booth such as a panel heater, the unnecessary paint may be peeled off the walls merely by turning on the switch of the heater and then, for example, by tapping the walls with a hammer and such a great trouble as scraping with a pallet and the like is not needed.

The paint peeling method related to the present invention will be particularly described next. In this method, in addition to the above-descrived paint peeling composition, a paint readherence preventing composition acting also as a paint peeling promoting composition is used.

Of the above compositions, polyvinylalcohol contained in the paint peeling composition has good resolving characteristics and at the same time has no blocking characteristics. Therefore, the polyvinylalcohol has superior protective colloid characteristics for the paint and at the same time has an effect to strengthen the film after drying.

A specific preparation of the paint peeling composition will be described next.

| | |
|---|---|
| polyvinylalcohol | 21 weight percent |
| (average polymerization degree 500, saponification degree 88 mol %) | |
| synthetic resin micro balloons | 8 weight percent |
| methylcellulose | 2 weight percent |
| water | 68 weight percent |

In addition to these, thixotropy promoting agent, antiseptic agent, rust inhibitor, defoaming agent and the like are conveniently added thereto.

An actual preparation of the above composition is carried out as follows.

Firstly, a solution tank is filled with water of 15° to 25° C. and polyvinylalcohol is added thereto under stirring. Then, this liquid is heated under sufficient stirring up to approximately 90° C. In about 30 minutes, the polyvinylalcohol is completely dissolved. To this solution, methylcellulose is added. After cooling of this mixture to below 30° C., synthetic resin microballoon and the other additives are added thereto and the mixture is stirred and dispersed at a high speed. In this embodiment, it is to be noted, the employed synthetic micro balloons for reinforcing the coating after drying starts foaming at approximately 60° to 80° C. and foams most actively at 100° C.

The obtained paint peeling composition was applied to a piece of duckboard (20 cm square) by way of example of the object not to be painted. Since the composition contains relatively small amount of water, the drying speed was considerably shortened and at the same time since the formed coating had sufficient strength because of its large thickness, the coating was not peeled off the board when this was stamped upon by safety boots of a worker and the like.

For metalic objects, it is to be noted, various kinds of starches were found effective as an additive for securing the coating on the surface of the object.

A specific preparation of the paint readherence prevention composition will be described next.

| | |
|---|---|
| polyvinylalcohol | 10 weight percent |
| (average polymerization degree 1700, saponification degree 88 mol %) | |
| water | 85 weight percent |

In addition to these, thixotropy promoting agent, antiseptic agent, rust inhibitor, defoaming agent and the like are conveniently added thereto.

An actual preparation of this paint re-adherence preventing component is the same as that for preparing the paint peeling component.

Experiments were carried out using the above paint peeling composition.

(EXPERIMENT 1)

The duckboard coated with the paint peeling composition and another piece of duckboard un-coated with the paint peeling composition were left intact at a painting site for 6 days until unnecessary paint having thickness of 6.2 mm on the average was accumulatedly adhered to both of the boards. The employed paint is a thermosetting baking paint.

Firstly, caustic soda liquid (concentration: 200g/l, boiling temperature 105 ° C.) as a paint peeling bath was prepared and then the buck boards were dipped in this bath to measure paint peeling time.

In the case of the duckboard coated with the paint peeling composition, the unnecessary paint was completely peeled off the board in 90 seconds without leaving any trace thereof. On the other hand, in the case of the duckboard un-coated with the composition, even after the board was boiled in the bath for 8 hours, only about 50 % of the bare surface of the board was exposed with the other 50% thereof still covered with the unnecessary paint of approximately 0.1mm in thickness.

After the above paint peeling operations, the peeled-off paint was floating as minute particles in the bath as a whole. Thus, a filter was necessary to collect the same.

Though as a rough time measurement, the paint peeling time was shortened to 1/320 with the use of the paint peeling composition. That is to say, the fuel cost and the labor cost for continuously boiling the bath were significantly reduced.

However, the caustic soda liquid is not desirable as the paint peeling bath because of the troublesome waste liquid processing and waste paint collecting and also of the human health hazard and the like. Therefore, the same experiment was carried out, this time, using the paint re-adherence preventing composition related to the present invention as the paint peeling bath. More particularly, the paint readherence preventing composition diluted by 20 times as much water was used as the paint peeling bath.

As the result, in the case of the duckboard precoated with the paint peeling composition, the unnecessary paint was completely peeled off in 90 seconds. On the other hand, in the case of the duckboard un-coated with the paint peeling composition, only the surface there lost its viscosity. Since this paint peeling bath has no paint resolving characteristics, the experiment was stopped after 90 seconds.

After the above experiment, the paint peeling bath remained transparent with the peeled-off paint floating in a non-viscous condition on the surface of the liquid in the form of ball and the like. Thus, the paint was easily collected by a simply constructed mesh. Further, when the paint peeling bath was cooled, the then-floating paint sank as a mass to the bottom of the tank and, thus, was easily collected at one time. The collected mass was non-viscous.

As described above, with the use of the paint peeling bath containing the paint re-adherence preventing compostion, because of the effect of the paint re-adherence preventing composition, it is possible to easily collect the peeled-off paint as a mass without the paint sticking to other objects. And at the same time, the paint peeling bath may be reusable for a long period of time only by adding thereto an amount of water equal to that evaporated in the heating. In this way, the working efficiency is considerably improved and maintanance cost is considerably reduced since there is no need for waste liquid processing. Moreover, the working environment is also considerably improved since this paint peeling bath poses no human health hazard.

(EXPERIMENT 2)

The paint peeling composition of the present invention was sprayed over the floor of the working site to form a coating thereon of approximately 0.4 mm in thickness. After air-drying for 6 hours, the dried coating had a thickness of 0.1 mm. Then, the coated floor was left intact for 1 hour until unnecessary paint was accumulatedly adhered thereon of 7.3 mm thickness.

Thereafter, the boiling paint peeling composition used in Experiment 1 was gradually spilled on the floor from its end with lifting up a peeled-off portion and spilling the composition between the floor face and the paint film, the paint was completely peeled off at a rate of 1 m per about 7 minutes. Also, because of the effect of the paint re-adherence preventing composition of the present invention, the paint lost viscosity and was peeled off as a sheet.

What is claimed is:

1. An aqueous paint peeling composition for forming a coating on a surface of an object thereby to permit ready removal of undesired paint subsequently applied onto the coating surface, comprising as effective components thereof:
   17 to 25 weight percent of polyvinylalcohol;
   a substance which when heated is in the form of minute shells enclosing a gas or vapor, the shells being thermally expandable without rupturing.

2. A composition as claimed in claim 11, wherein said substance is at least one of shirasu balloons, glass balloons, carbon balloons, foamed synthetic resin balloons and unfoamed synthetic resin which is heat foamable to form synthetic resin balloons.

3. A composition as claimed in claim 1, wherein said substance is thermally expandable at a temperature higher than a drying temperature of the excess paint.

4. A composition as claimed in claim 11, wherein said substance is foamed synthetic resin balloons.

5. A composition as claimed in claim 1, wherein said substance is unfoamed synthetic resin which is heat foamable to form synthetic resin balloons.

* * * * *

UNITED STATES PATENT AND TRADEMARK OFFICE
CERTIFICATE OF CORRECTION

PATENT NO. : 4,844,833
DATED : July 4, 1989
INVENTOR(S) : Keisaku Komatsu et al

It is certified that error appears in the above-identified patent and that said Letters Patent is hereby corrected as shown below:

COLUMN 8

Claim 2, line 1, change "11" to --1--.

Claim 4, line 1, change "11" to --1--.

Signed and Sealed this

Eighth Day of September, 1992

*Attest:*

DOUGLAS B. COMER

*Attesting Officer*     *Acting Commissioner of Patents and Trademarks*